United States Patent [19]

Bodine

[11] 4,337,158
[45] Jun. 29, 1982

[54] CYCLIC WAVE SYSTEM FOR UNCLOGGING WATER SCREENS

[76] Inventor: Albert G. Bodine, 7877 Woodley Ave., Van Nuys, Calif. 91406

[21] Appl. No.: 128,736

[22] Filed: Mar. 10, 1980

[51] Int. Cl.³ .......................... B07B 1/54; B01D 35/20
[52] U.S. Cl. .................................... 210/785; 210/748; 210/413; 210/415
[58] Field of Search .................. 210/388, 413, 415, 19, 210/DIG. 18, DIG. 22, 748, 785

[56] References Cited

U.S. PATENT DOCUMENTS

| | | | |
|---|---|---|---|
| 1,932,663 | 10/1933 | Haug | 210/19 |
| 2,727,441 | 12/1955 | Cram | 210/19 |
| 3,617,543 | 11/1971 | Smith | 210/19 |
| 4,028,247 | 6/1977 | Yessaian | 210/388 |
| 4,158,629 | 6/1979 | Sawyer | 210/785 |

FOREIGN PATENT DOCUMENTS

| | | | |
|---|---|---|---|
| 1932950 | 1/1971 | Fed. Rep. of Germany | 210/19 |
| 2427053 | 1/1975 | Fed. Rep. of Germany | 210/DIG. 22 |
| 46-43349 | 12/1971 | Japan | 210/388 |

*Primary Examiner*—Benoît Castel
*Attorney, Agent, or Firm*—Edward A. Sokolski

[57] ABSTRACT

Liquid having solid particles therein to be filtered out, such as a water slurry, is fed to the outer surface of a filtering device, such as a filter screen, and fed therethrough to the opposite side thereof. A cyclic wave generating device, which may comprise a curved blade, operates in the nature of a hydrofoil to deliver pressure pulses against the last-mentioned surface of the screen to provide shock waves in the liquid in a radial direction opposite to the liquid flow through the screen, such shock waves loosening the particles that may become lodged on the intake part of the screen thereof preventing clogging of such screen. Resonant vibratory energy may also be applied to the liquid on the output side of the screen to effect clearing of the input side of such screen.

15 Claims, 4 Drawing Figures

CYCLIC WAVE SYSTEM FOR UNCLOGGING WATER SCREENS

This invention is related to the filtering of solid material from a liquid, and more particularly to apparatus and a technique employing shock waves and/or sonic waves to prevent the filter being employed from becoming clogged.

In the filtering of solid material from a liquid, particularly where rather fine filtering is employed, it is difficult to prevent the filter, screen-type or otherwise, from becoming clogged with the solid particles. Various techniques have been tried for alleviating this situation. One of these approaches employing pressure oscillations at a frequency of the order of 10-15 Hz is described in U.S. Pat. No. 3,409,125, issued Nov. 5, 1968. It has been found, as described in my co-pending application Ser. No. 886,163, filed Mar. 13, 1978, now abandoned, that when dealing with air media filters, sonic energy can be effectively used to provide periodic pressure pulses at a filter screen in a direction opposite to the fluid flow to prevent particles from clogging the apertures of the filter. The present invention is an adaptation of the basic concepts of this prior invention and improvement thereover to facilitate liquid filtering by preventing the clogging of the filters used for such filtering.

This end result is achieved in the present invention by generating cyclic pressure waves on the downstream side of the filter which waves are transmitted through liquid and the filter so as to dislodge solid particles which may become lodged in the filter on the upstream side thereof. A slurry containing the bulk of the solid material is carried away from the upstream filter side while the filtered liquid is removed from the downstream side. In one embodiment of the invention, the aforementioned end results are achieved by employing a cylindrical filter screen with the liquid to be filtered being fed to the outer walls of the cylinder and radially therethrough towards the center of the filter. A paddle structure formed from a pair of oppositely positioned curved blades is rotatably driven with the blades passing in close proximity to the inner walls of the screen which operate in the nature of hydrofoils to generate shock waves in the liquid layer confined between the arcuate "ski-nose" shaped ends of the blades and the screen which effectively operate to dislodge solid particles from the upstream side of the screen. The speed of rotation of the blades can be adjusted to achieve an optimum shock wave for properly clearing the screen without impairing normal flow through the filter. The action of the paddle wheels can be aided by feeding sonic vibratory energy to the paddle structure from an orbiting mass oscillator, this vibratory energy passing through the water to facilitate dislodgement of particles from the outside walls of the screen.

In a second embodiment of the invention, dislodgement of the screen is achieved solely by means of sonic energy, a resonant bar member being placed at the center of the cylindrical screen which generates sonic waves which are radiated outwardly through the liquid and filter.

It is therefore an object of this invention to facilitate the unclogging of liquid filters.

It is another object of this invention to provide means employing vibratory waves to free solid material from a filter.

Other objects of this invention will become apparent as the description proceeds in connection with the accompanying drawings of which:

Figure 1:
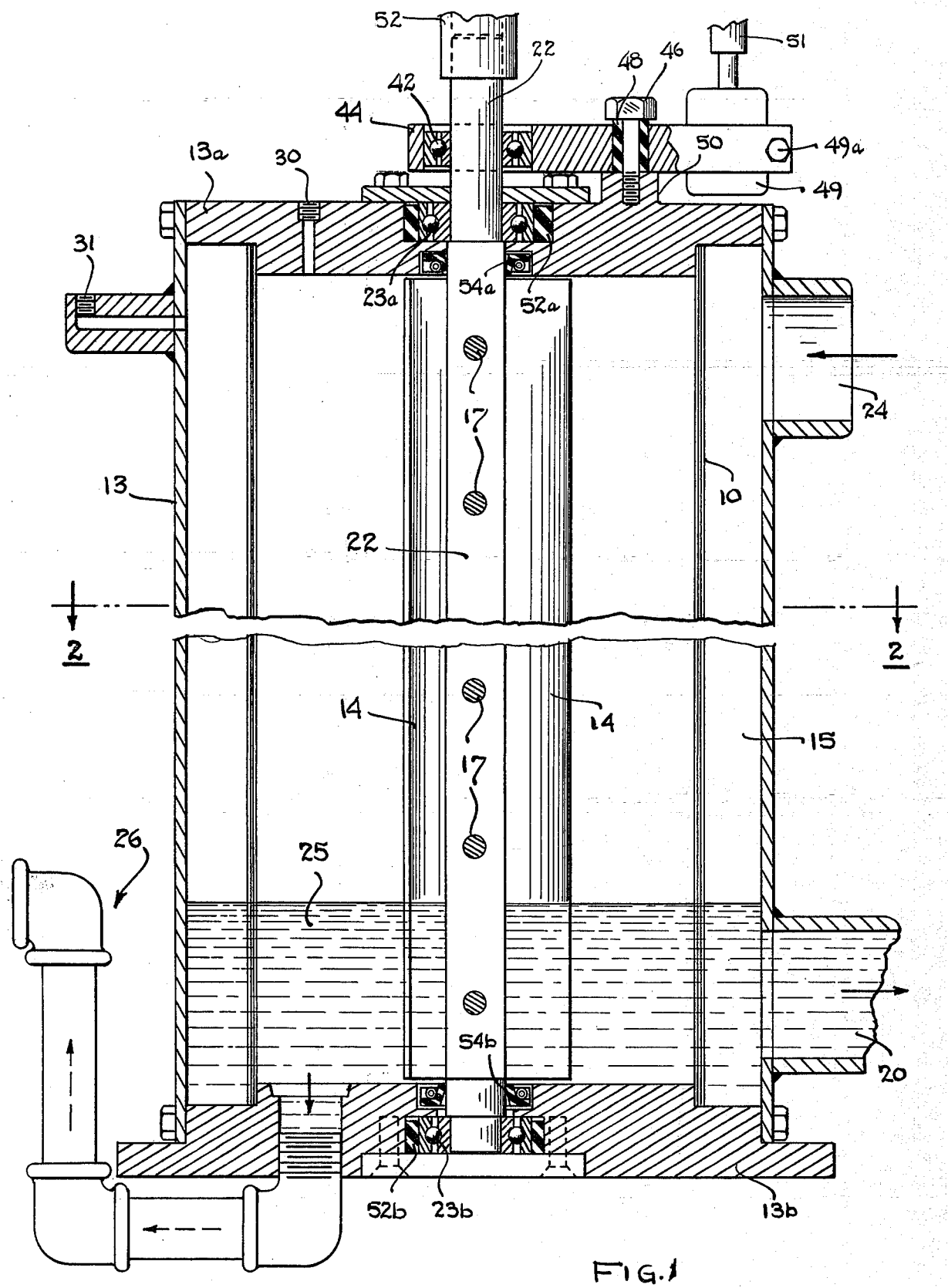
FIG. 1 is a cross-sectional view in elevation of a first embodiment of the invention.
Figure 2:
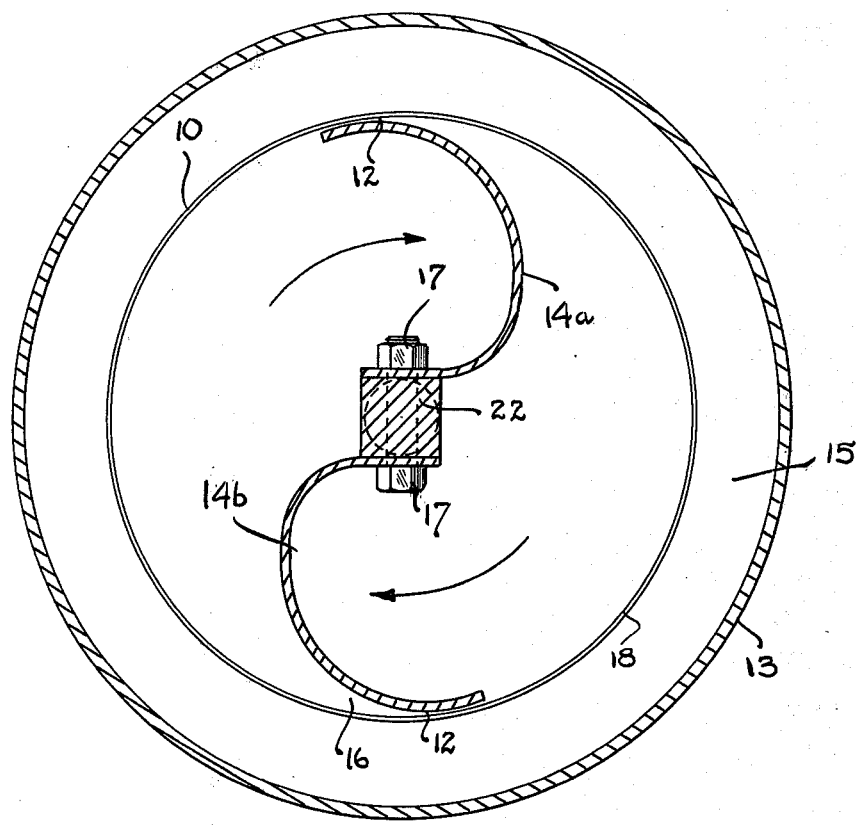
FIG. 2 is a cross-sectional view taken along the plane indicated by 2—2 in FIG. 1.

Referring now to FIGS. 1 and 2, a first embodiment of the invention is illustrated. Mounted within cylindrical chamber 13 is a cylindrical screen 10, an annular passageway 15 being formed between the inner wall of the chamber and the screen, screen 10 typically comprising a 200-mesh screen. Shaft 22 is rotatably supported on ball bearings 23a and 23b which are mounted in the top and bottom end walls 13a and 13b of the housing. Bearings 23a and 23b are mounted within rubber bushings 52a and 52b to provide radial compliance for the bearings and vibration isolation for the housing, so as to be described further on in the specification. Liquid seals 54a and 54b are provided around the shaft to prevent the escape of liquid in the chamber along the walls of the shaft. Connected to shaft 22 by means of bolts 17 are a pair of curved paddle members 14a and 14b which are symmetrical in configuration and located on opposite sides of the shaft. The curved end portions of the paddle wheels are substantially arcuate and run in close proximity to the inner wall of screen 10 but do not touch the screen wall.

The liquid slurry to be filtered is fed in through inlet port 24 at a pressure sufficient to cause flow through the filter, with the thick slurry reject material being outletted through outlet port 20. The filtered liquid 25, which passes through the screen 10 to the center of the chamber, is outletted through riser pipe 26 to assure that there is a level of water in the region of the rotor formed by the paddle members 14a and 14b. Also, on occasion it may be necessary to feed a certain amount of "priming" liquid into the chamber through inlet 30, the liquid being necessary to the generation of shock waves as the paddles rotate, as to be explained further on in the specification. A pressure gauge connection 31 may be provided to enable the installation of a pressure gauge for measuring the feed pressure of the annulus 15.

Lever arm member 44 is clamped to shaft 22 by means of ball bearing assembly 42, the inner race of which is tightly force-fitted to the shaft and the outer race of which is tightly force-fitted to the arm. Arm 44 is supported on a thrust bearing 50 which is fixedly attached to the top cover 13a of the chamber. The arm is secured to thrust bearing 50 by means of pivot bolt 46 which has a rubber bushing 48 around the shaft thereof which allows a small degree of pivotal freedom of motion for the arm and thereby effectively provides vibrational isolation between the chamber and the arm for the lateral vibrational modes generated therein by oscillator 49. Orbiting mass oscillator 49, which may be of the type described in my U.S. Pat No. 3,217,551, and my co-pending application Ser. No. 953,681, now U.S. Pat. No. 4,218,849, is fitted within a forked portion (not shown) of arm 44 and clamped thereto by means of clamp bolt 49a. The oscillator is rotatably driven by means of drive motor 51.

Shaft 22 is rotatably driven by drive motor 52 at a speed which is typically of the order of 1200 rpm. The paddle wheels 14a and 14b are thus rotatably driven around within screen 10 with the curved end portions of the paddle wheels in close proximity to the inner surface of the screen. The paddle wheels operate as hydrofoils against the thin water layer 12 formed on the inner screen walls effectively "trowelling" the water layer and generating shock waves therein. By adjusting the rpm of the rotor formed by the paddle members, the amplitude and frequency of the shock waves can be adjusted to optimum values which will keep the screen clear without significantly impeding the flow through the filter. It is, of course, essential that the inner walls of the screen have a thin layer of liquid 12 on them at all times. To assure that such is the case, riser pipe 26 is provided to maintain a level of liquid within the chamber. Also, if need be, additional "priming" water can be fed into the chamber through inlet 30.

In an operative embodiment of the invention employing a 6" diameter screen cylinder 10 having a length of 16" and a 200-mesh screen, excellent results were achieved in filtering wash water from Illinois coal which is notorious for its tendency to blind screens. This machine employed a 6 psi feed pressure through inlet 24 with the paddle wheel rotor running at 1200 (±100) rpm.

While in certain instances the desired unclogging effect can be achieved solely with the use of the paddle members 14a and 14b, in situations where the liquid to be filtered has specially high adhesive characteristics, additional unclogging action can be achieved by superimposing sonic vibratory energy on the shock wave. This is achieved in the device of the present invention by means of orbiting mass oscillator 49 which transfers vibratory energy through arm 44 and bearing 42 to shaft 22. Oscillator 49 generates a rotating force vector turning about its vertical axis so as to cause lever arm 44 to vibrate with an orbital motion which laterally oriented vibration is delivered to shaft 22 through bearing 42. The drive shaft of oscillator 49, as well as the drive shaft of drive motor 52, has flexible tubular coupling means incorporated therein (not shown) so that these motors are isolated from the vibratory energy which is typically at a frequency of the order of 200 Hz. The vibration of shaft 22 and the paddle members 14a and 14b has a relatively short stroke, typically of the order of ⅛" or less. The vibrational energy can be highly effective even though small in amplitude in view of the intimate coupling afforded through the firmly packed liquid layer 12 between the paddle member-hydrofoil and the screen. In some instances, the superimposed vibratory energy can have an amplitude of as little as 0.0001" and still operate effectively.

Figure 4:
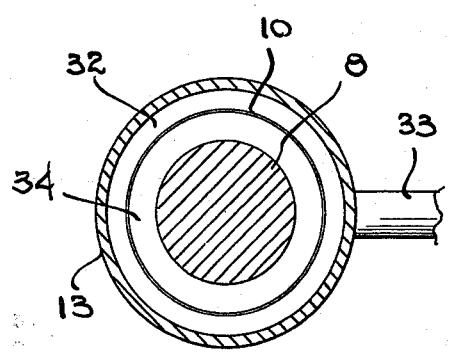
FIG. 4 is a cross-sectional view taken along the plane indicated by 4—4 in FIG. 3.
Figure 3:
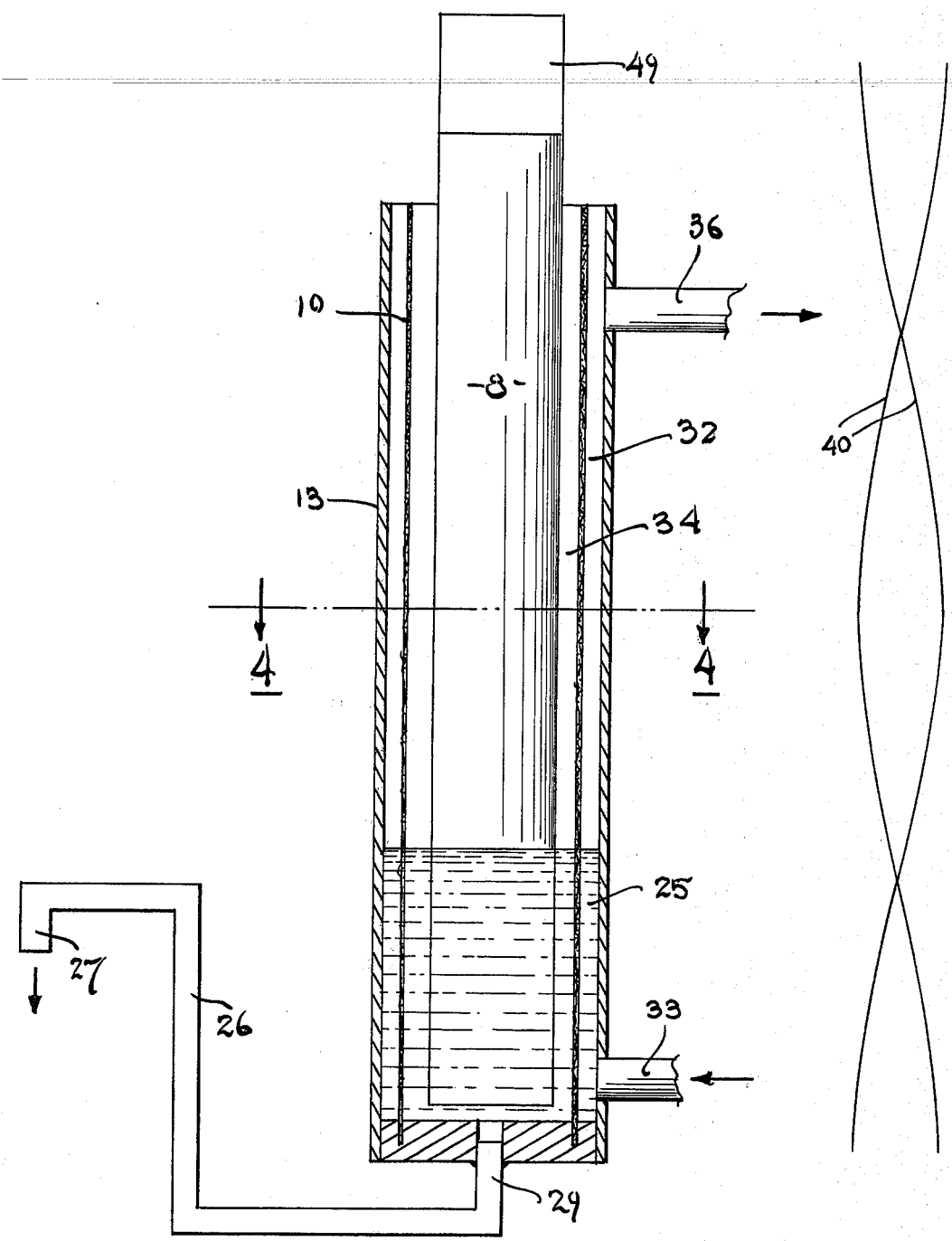
FIG. 3 is an elevational view in cross section of a second embodiment of the invention.

Referring now to FIGS. 3 and 4, a second embodiment of the invention is schematically illustrated. In this second embodiment, all of the energy for unclogging the screen is provided by means of sonic energy. Cylindrical chamber 13 has a cylindrical screen member 10 mounted therein with an inlet 33 for the slurry to be filtered provided at the bottom of the chamber and an outlet 27 for the filtered liquid being provided via a riser 26 which establishes a suitable water level in the chamber. Contained within screen member 10 in internal concentricity therewith is resonant bar 8 which is driven in a resonant rotary gyratory or quadrature vibrational mode, as indicated by wave pattern 40, by means of orbiting mass oscillator 49 which may be the same type of oscillator as described for the first embodiment. With the resonant bar 8 being driven resonantly in quadrature, as indicated by wave pattern 40, and with liquid 25 around the bottom of the bar, the resulting rotational sonic energy radiates pulses backward and circumferentially from the bar through inner annulus 34 and screen 10, i.e., opposite to the direction of the liquid flow to the screen, thereby keeping the screen free of clogging material. It is to be noted in this regard that the vibratory pressure points rotate around the screen due to the quadrature of rotary gyratory motion of the bar.

The thicker slurry material which has been filtered from the filter is forced up through the outer annulus 32 formed between the outer wall of screen 10 and the inner wall of chamber 13 and gradually becomes dryer and dryer as a result of the sonic wave action radiated from the gyratory bar through the screen and onto the mass of the slurry. Any moisture drops down the screen and is drained out at the water outlet 29. With some types of feed materials, this dewatering flow can in this described way be accomplished by the apparatus of FIG. 1.

It is to be noted that in this form of the invention there is an air coupling region between the upper portion of the gyratory bar and the screen. In view of this air coupling, it is desirable that the gyratory bar be quite active, and hence it is preferable to use a low-impedance bar material which will result in a large amplitude vibration. It is also desirable that the gyratory bar operate at a relatively low frequency (of the order of 100–500 Hz) so that there will be a large stroke causing good compression waves in the upper annulus of air. The solid material, which is generally in the form of a powder, is ejected from outlet 36 after it has been considerably massaged by the vibration of the air, this outlet establishing the high point of the level of the filtered solid material accumulated in the outer annulus 32.

While the invention has been described and illustrated in detail, it is to be clearly understood that this is intended by way of illustration and example only and is not to be taken by way of limitation, the spirit and scope of this invention being limited only by the terms of the following claims.

I claim:

1. In an apparatus for filtering liquid and removing solid material therefrom including means for containing said liquid, nonrotating filter means having fluid input and output sides mounted in said liquid containing means, and pressure means for flowing said liquid radially through the filter means from the input to the output side, wherein the improvement comprises
    means for generating cyclic pressure pulses at the output side of the filter means,
    cyclically moving means for radiating said pulses in said liquid on the fluid output side of said filter means and through said filter means solely in a direction opposite to the flow of said liquid through said filter means and
    means for removing the solid material from the liquid containing means.

2. The apparatus of claim 1 wherein said means for generating cyclic pressure pulses comprises curved paddle means having blade end portions spaced in close proximity to the output side of said filter means to form a thin liquid layer between said blade end portions and said filter means and means for cyclically driving said paddle means at a speed such as to set up shock waves in said liquid layer with the end portions thereof passing along the output side of said filter means.

3. The apparatus of claim 1 wherein said means for generating cyclic pressure pulses comprises an orbiting mass oscillator and said means for radiating said pulses comprises a bar member mounted in said liquid on the fluid output side of the filter means, the vibratory output of said oscillator being coupled to said bar member and being at a frequency such as to cause resonant vibration of the bar member.

4. The apparatus of claim 3 wherein the filter means comprises a cylindrical screen filter, said bar member being mounted in internal concentricity with said filter.

5. In an apparatus for filtering liquid and removing solid material therefrom including means for containing said liquid, non-rotating filter means having fluid input and output sides mounted in said liquid containing means, and pressure means for flowing said liquid radially through the filter from the input to the output side, wherein the improvement comprises means for generating cyclic pressure pulses comprising curved paddle means having blade end portions spaced in close proximity to the output side of said filter means to form a thin liquid layer between said blade end portions and said filter means, and means for cyclically driving said paddle means at a speed such as to set up shock waves in said liquid layer with the end portions thereof passing along the output side of said filter means, means for generating vibratory energy at a frequency substantially higher than that of said pressure pulses, and means for coupling the vibratory energy to said paddle means whereby the vibratory energy is superimposed on the pressure pulses in said liquid, cyclically moving means for radiating said pulses in said liquid on the fluid output side of said filter means and through said filter means solely in a direction opposite to the flow of said liquid whereby the solid material is separated from the liquid, and means for removing the solid material from the liquid containing means.

6. The apparatus of claims 2 or 5 wherein the filter means comprises a cylindrical screen filter and said paddle means comprises a shaft positioned in internal concentricity with said filter and a pair of similar arcuate paddle members attached to said shaft in symmetrical relationship on the opposite sides thereof, said cyclical driving means comprising motor means for rotatably driving said shaft whereby the end portions of said paddle members sweep along the output side of the filter in close proximity thereto with a thin layer of liquid being formed between the paddle members and the screen in which shock waves are generated.

7. The apparatus of claims 1, 2, 5 or 3 wherein said filter means comprises a cylindrical screen filter and said liquid containing means comprises a chamber.

8. In an apparatus for filtering liquid and removing solid material therefrom including means for containing said liquid, a nonrotating filter screen having fluid input and output sides mounted in said liquid containing means, and means for flowing said liquid through the filter from the input side to the output side, wherein the improvement comprises paddle means having portions thereof which are positioned in close proximity to the output side of the screen, means for driving said paddle means cyclically along the output side of the filter, a thin layer of liquid being formed between the proximate portions of the paddle means and the screen, pressure pulses being formed in said liquid layer as said paddle means is driven, said pressure pulses being radiated through said filter solely in a direction opposite to that of the flow of liquid through the filter and means for removing the solid material from the liquid containing means.

9. The apparatus of claim 8 wherein the screen is cylindrical, the paddle means comprising a plurality of arcuate paddle member positioned symmetrically within said screen, said paddle means having turned-up "ski-nose" shaped end portions positioned in close proximity to said screen, said driving means comprising a drive shaft coupled to said paddle members and motor drive means for rotatably driving said shaft such that the liquid layer is formed between the screen and the end portions of the paddle members.

10. A method for unclogging a non-rotating filter screen through which liquid is being flowed comprising the steps of forming a thin layer of liquid on the downstream side of said filter screen, generating cyclic pressure pulses on the downstream side of the screen in said thin liquid layer, and coupling said pressure pulses through said thin liquid layer and said screen in a direction opposite to the liquid flow through the screen.

11. The method of claim 10 wherein the pressure pulses are generated by cyclically traversing a portion of a paddle members along the downstream side of the screen in close proximity thereto.

12. In an apparatus for filtering liquid and removing solid material therefrom including means for containing said liquid, a nonrotating cylindrical filter screen having fluid input and output sides mounted in said liquid containing means, and means for flowing said liquid through the filter from the input side to the output side, wherein the improvement comprises a plurality of arcuate paddle members positioned symmetrically within said screen, said paddle members having turned up "ski-nose" shaped end portions positioned in close proximity to the screen, motor drive means for driving said paddle members cyclically along the output side of the filter, a thin layer of liquid being formed between the proximate portions of the paddle members and the screen, pressure pulses being formed in said liquid layer as said paddle members are driven, said pressure pulses being radiated through said filter solely in a direction opposite to that of the flow of liquid through the filter, means for generating vibratory energy at a frequency substantially higher than that of said pressure pulses, means for coupling the vibratory energy to the paddle members whereby said vibratory energy is superimposed on the pressure pulses and the solid material is separated from the liquid thereby, and means for removing the solid material from the means for containing the liquid.

13. The apparatus of claim 12 wherein the means for generating vibratory energy comprises an orbiting mass oscillator, an arm member coupled to said oscillator, and means for coupling the arm member to the paddle member drive shaft.

14. A method for unclogging a non-rotating filer screen through which liquid is being flowed comprising the steps of forming a thin layer of liquid on the downstream side of said filter screen, generating cyclic pressure pulses on the downstream side of the screen in said thin liquid layer by cyclically traversing a portion of a paddle member along the downstream side of the screen in close proximity thereto, coupling said pressure pulses through said thin liquid layer and said screen in a direction opposite to the liquid flow through the screen, and generating vibratory energy pulses at a frequency substantially higher than that of the cyclic pressure pulses and superimposing the vibratory energy pulses on said pressure pulses.

15. The method of claim 14 wherein the amplitude and frequency of the pressure pulses are adjusted so as to remove material clogging the input side of the screen without significantly impairing the normal flow rate through the screen.

* * * * *